(12) United States Patent
Momosaki

(10) Patent No.: US 8,121,349 B2
(45) Date of Patent: Feb. 21, 2012

(54) ELECTRONIC APPARATUS AND VIDEO PROCESSING METHOD

(75) Inventor: Kohei Momosaki, Mitaka (JP)

(73) Assignee: Kabushiki Kaisha Toshiba (JP)

( * ) Notice: Subject to any disclaimer, the term of this patent is extended or adjusted under 35 U.S.C. 154(b) by 347 days.

(21) Appl. No.: 12/551,232

(22) Filed: Aug. 31, 2009

(65) Prior Publication Data

US 2010/0104146 A1 Apr. 29, 2010

(30) Foreign Application Priority Data

Oct. 23, 2008 (JP) ................................ 2008-273280

(51) Int. Cl.
*G06K 9/00* (2006.01)
*H04N 5/93* (2006.01)
(52) U.S. Cl. .......................... 382/103; 715/723; 386/278
(58) Field of Classification Search .................. 382/103, 382/118, 305; 715/723; 707/725, E17.028; 386/278
See application file for complete search history.

(56) References Cited

U.S. PATENT DOCUMENTS

| 6,032,156 | A | * | 2/2000 | Marcus | 707/104 |
| 2007/0214417 | A1 | * | 9/2007 | Toyama et al. | 715/723 |

FOREIGN PATENT DOCUMENTS

| GB | 2 395 852 A | 6/2004 |
| JP | 07-175816 A | 7/1995 |
| JP | 2001-167110 A | 6/2001 |
| JP | 2004-304854 A | 10/2004 |
| JP | 2006-510240 A | 3/2006 |
| JP | 2006-510240 A | 3/2006 |
| JP | 2007-280325 A | 10/2007 |
| JP | 2007-281680 A | 10/2007 |
| JP | 2008-017041 A | 1/2008 |
| JP | 2008-017041 A | 1/2008 |
| JP | 2008-017042 A | 1/2008 |
| JP | 2008-077536 A | 4/2008 |
| WO | WO 2004/051656 A1 | 6/2004 |

OTHER PUBLICATIONS

Notice of Reasons for Rejection mailed by Japan Patent Office on Nov. 17, 2009 in the corresponding Japanese patent application No. 2008-273280.
Notice of Reasons for Rejection mailed by Japan Patent Office on Feb. 9, 2010 in the corresponding Japanese patent application No. 2008-273280.
Notice of Reasons for Rejection mailed by Japan Patent Office on Jun. 1, 2010 in the corresponding Japanese patent application No. 2008-273280.
Computer Report, "NEC Has Developed a Technique of Detecting and Displaying Characters' Faces, and Automatically Generating a Table of the Videos," Feb. 2008, p. 58.
Explanation of Non-English Language References.

* cited by examiner

*Primary Examiner* — Andrew W Johns
(74) *Attorney, Agent, or Firm* — Knobbe, Martens, Olson & Bear LLP

(57) ABSTRACT

According to one embodiment, an electronic apparatus includes an image extraction module, a display control module, and a file processing module. The image extraction module extracts face images including a plurality of face images of persons in a video obtained by playing back a video data file from each of video data files. The display control module displays a selection screen which allows a user to select one or more video data files from the video data files, and displays the extracted face images on the selection screen to lay out the face images in correspondence with the video data files. The file processing module executes a process for the one or more video data files selected on the selection screen.

5 Claims, 9 Drawing Sheets

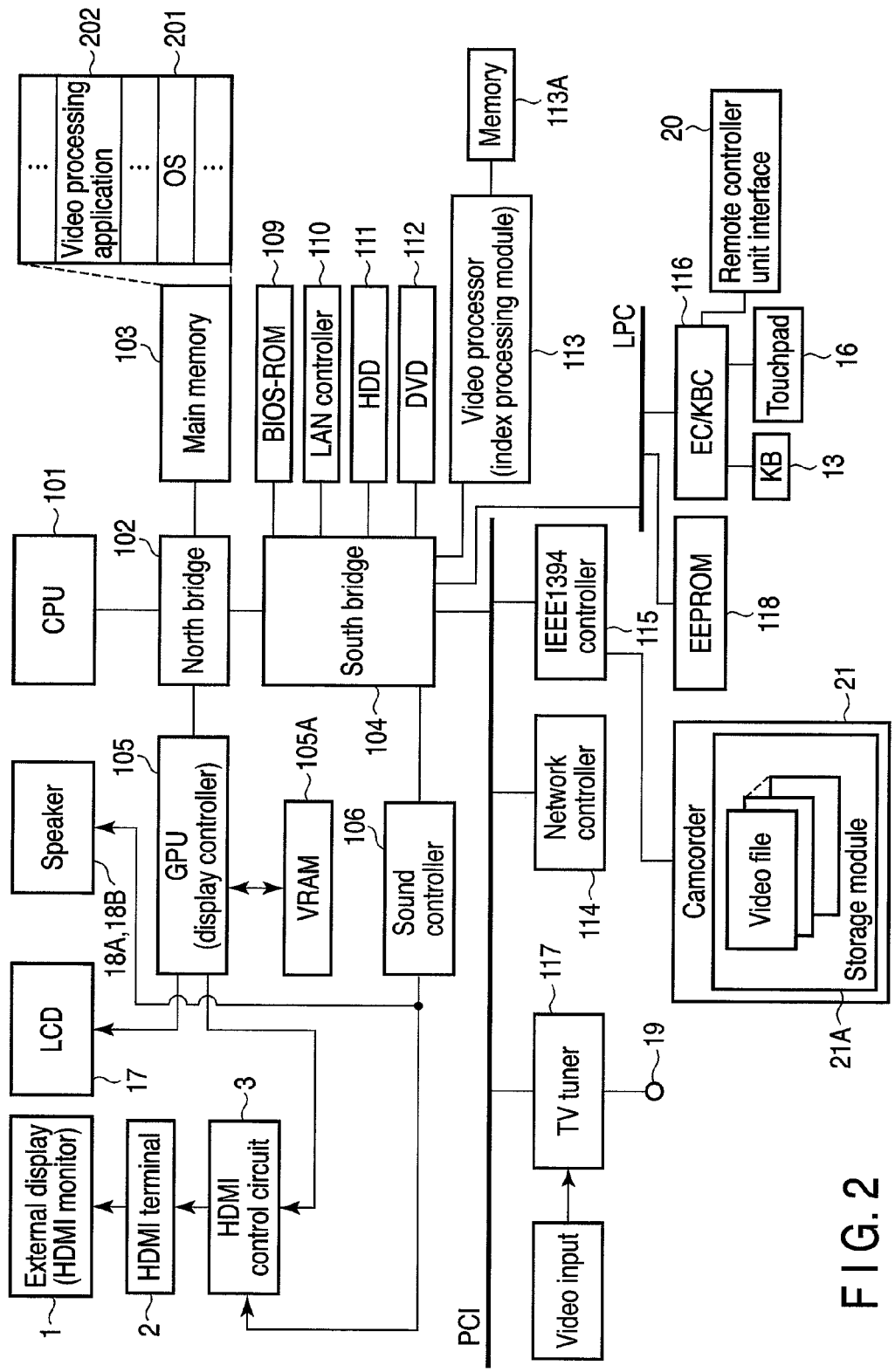
F I G. 2

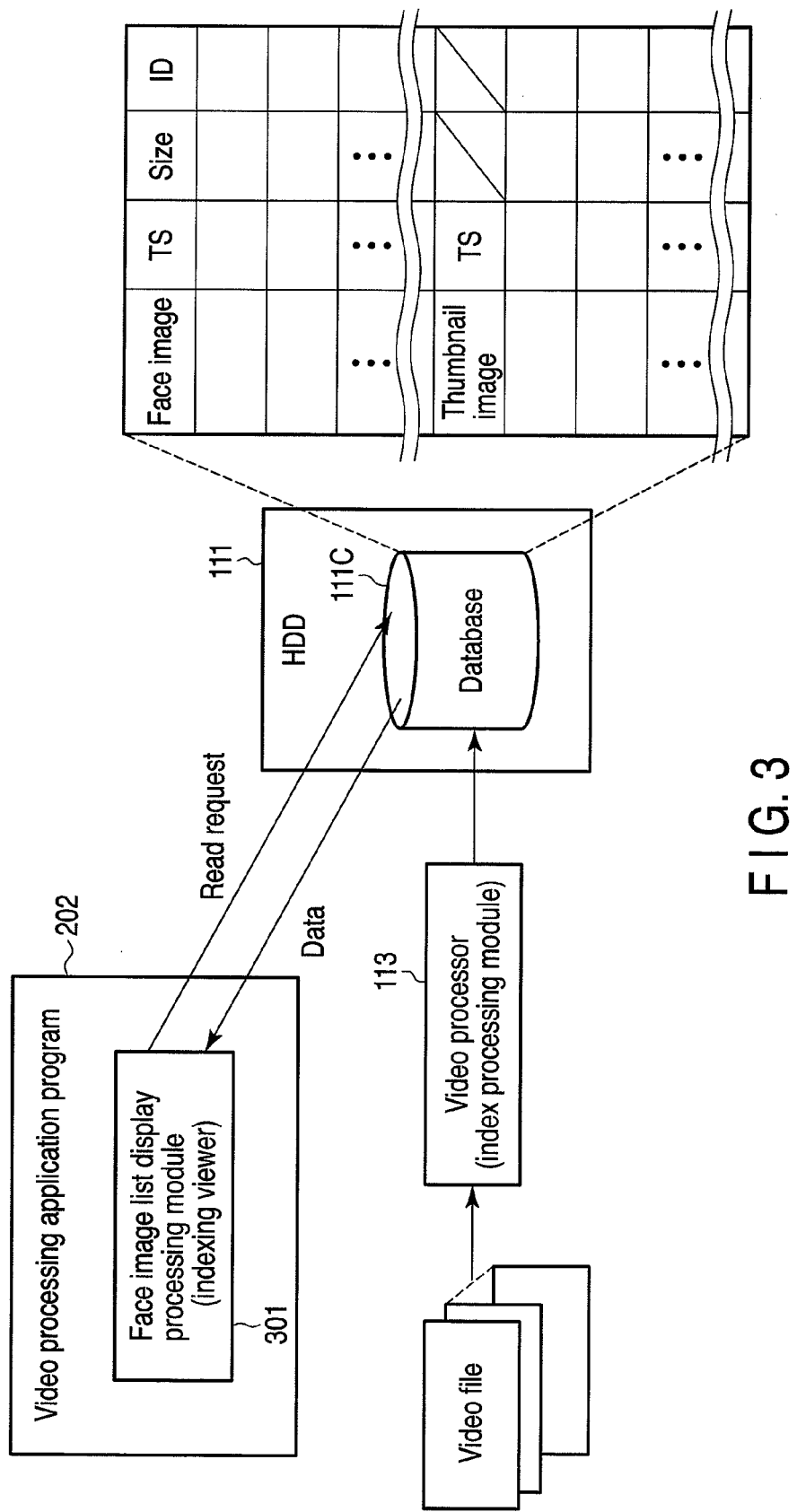
F I G. 3

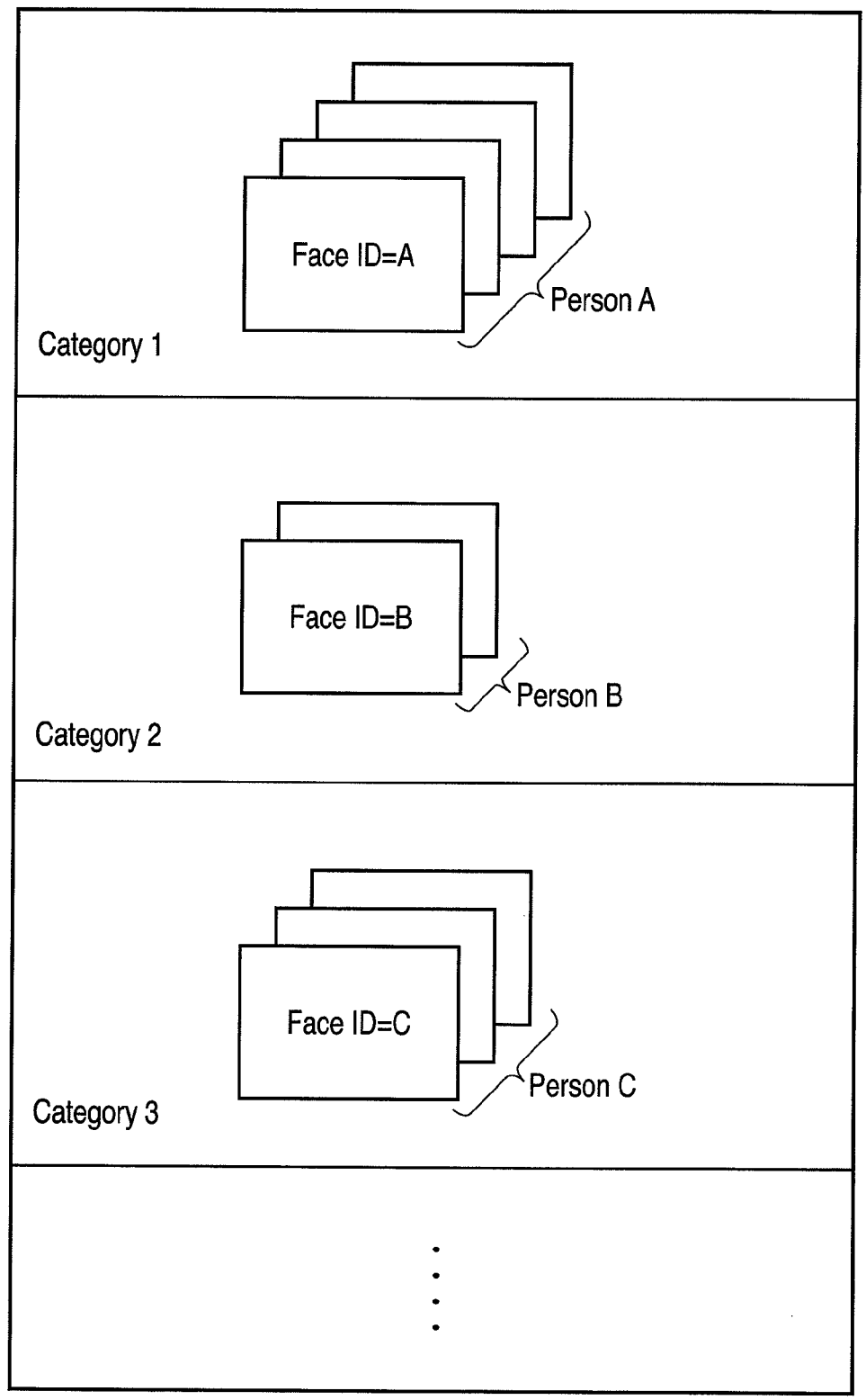
F I G. 4

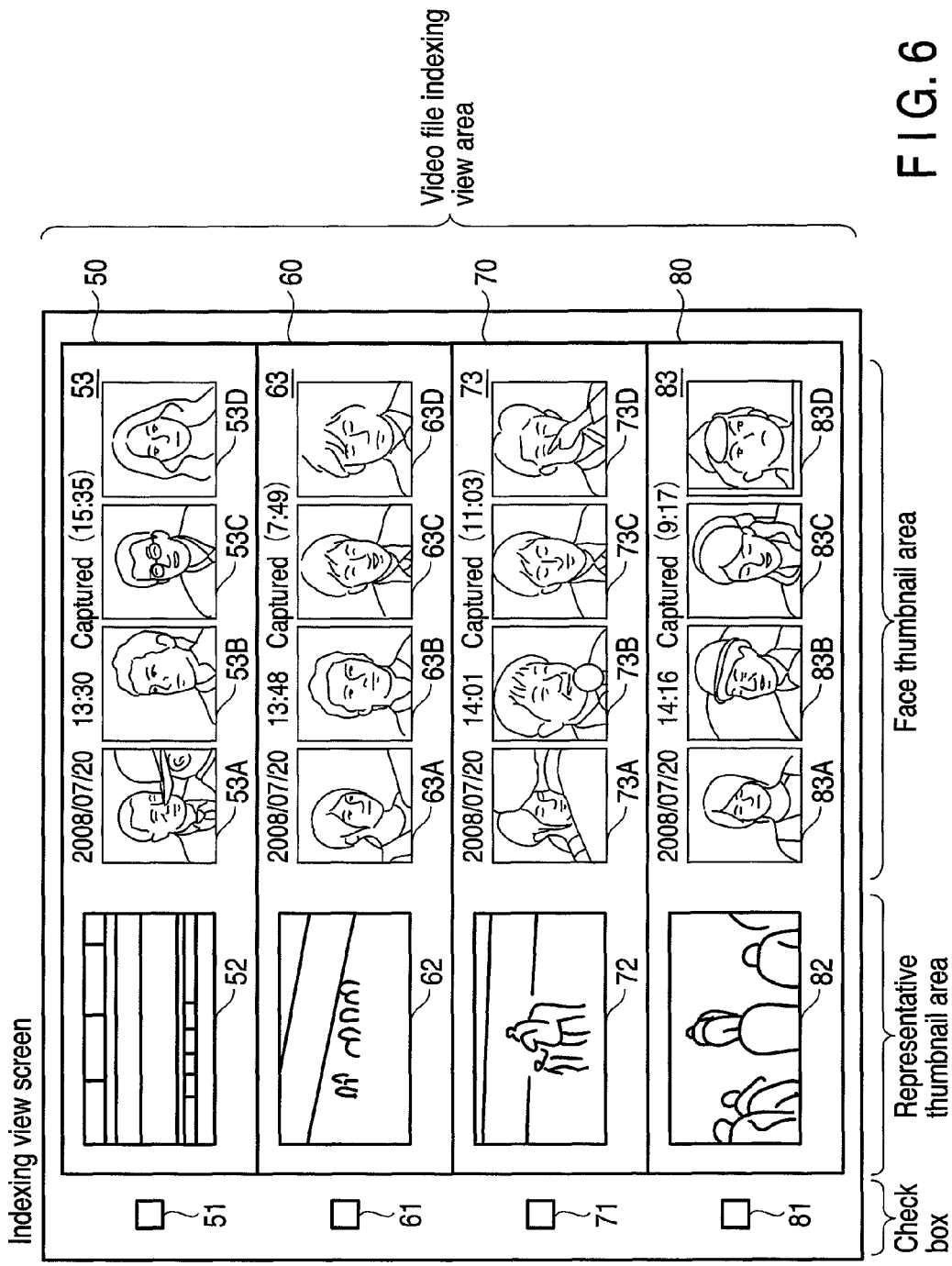
F I G. 6

ELECTRONIC APPARATUS AND VIDEO PROCESSING METHOD

CROSS-REFERENCE TO RELATED APPLICATIONS

This application is based upon and claims the benefit of priority from Japanese Patent Application No. 2008-273280, filed Oct. 23, 2008, the entire contents of which are incorporated herein by reference.

BACKGROUND

1. Field

One embodiment of the invention relates to an electronic apparatus and video processing method, which assist user's operations for video data files.

2. Description of the Related Art

In general, electronic apparatuses such as a camcorder, video recorder, and personal computer can record and play back various video data (moving image data). Data indicating a recording date and time of a video (e.g., an image capturing date and time or broadcast date and time) is appended to each video data stored in an electronic apparatus. It is difficult for the user to recognize the content of each video data based only on such appended data. For this reason, in order to recognize the content of video data, that video data has to be played back. However, playback of video data with a long total duration or that of a plurality of video data requires much time even when a fast-forward playback function or the like is used.

Jpn. Pat. Appln. KOKAI Publication No. 2008-17041 discloses an information processing apparatus which displays face thumbnail images. This information processing apparatus has a function of displaying face thumbnail images corresponding to video content as indices that allow the user to select all or some of video content.

In videos intermittently captured in a single day using a camcorder, videos having related content are often recorded in a plurality of files. Especially, every time a pause button or stop button is pressed, a file is created depending on the specification or the like of the camcorder. In such camcorder, a large number of files with related content are created, and it is difficult for the user to recognize correspondence between files and the stored video content.

Normally, the user can easily recognize one video data file to be played back or edited from a list of video frames extracted based on scene changes, detection of persons, and the like. As a result, the user can make a playback or edit operation by selecting full or a part of the video data file. However, it is troublesome for the user to make such operation for each of video data files with related content.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary block diagram showing an example of the system arrangement of the electronic apparatus according to the embodiment;

FIG. 3 is an exemplary block diagram for explaining an indexing information display function of the electronic apparatus according to the embodiment;

FIG. 4 is an exemplary view showing an example of face image groups used in the electronic apparatus according to the embodiment;

FIG. 6 is an exemplary view showing an example of an indexing view screen displayed on a display device by the electronic apparatus according to the embodiment;

DETAILED DESCRIPTION

Figure 1:
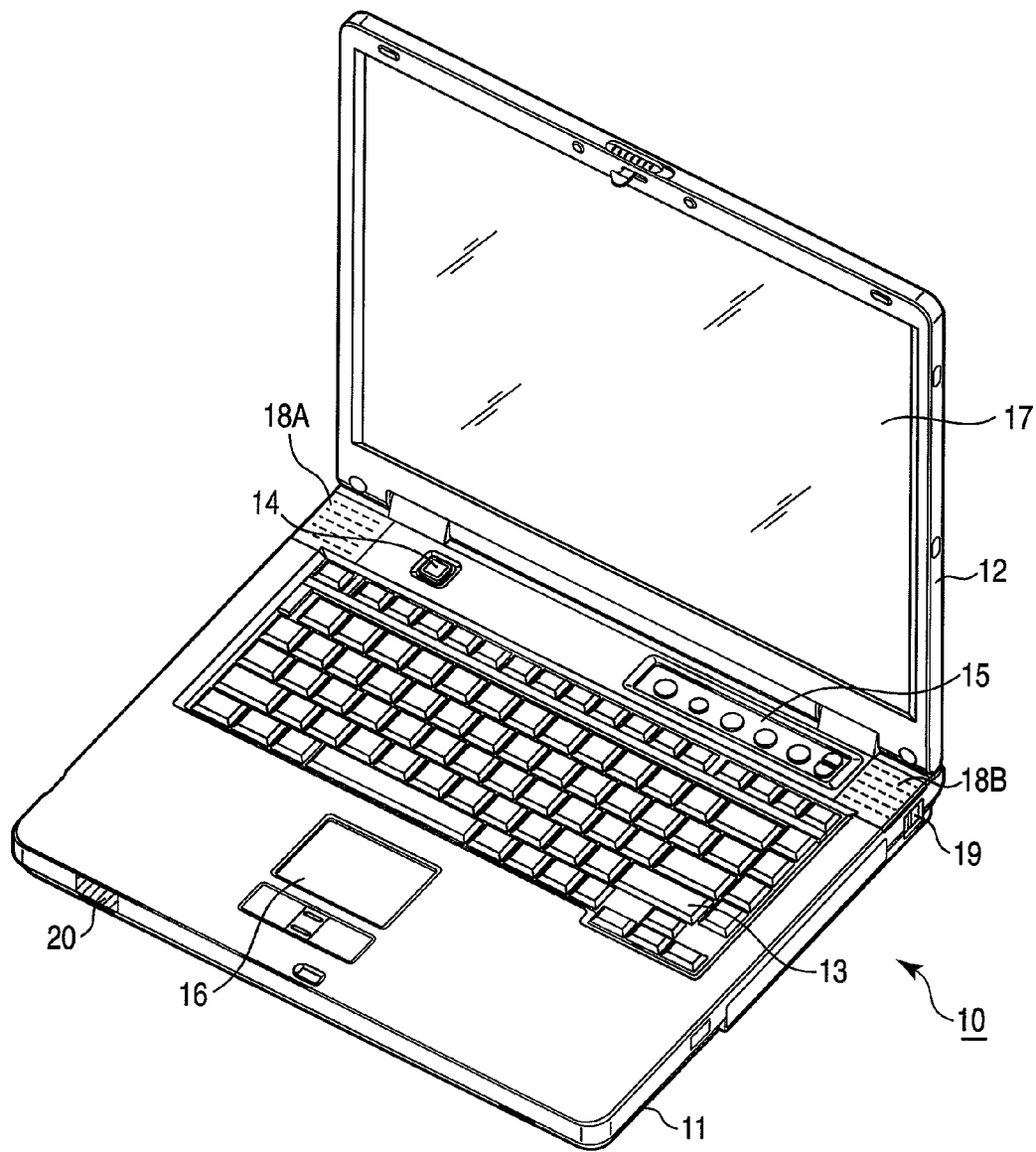
FIG. 1 is an exemplary perspective view showing an example of the outer appearance of an electronic apparatus according to an embodiment of the invention.

Various embodiments according to the invention will be described hereinafter with reference to the accompanying drawings. In general, according to one embodiment of the invention, there is provided an electronic apparatus comprising: an image extraction module configured to extract face images comprising a plurality of face images of persons in a video obtained by playing back a video data file from each of video data files; a display control module configured to display a selection screen which allows a user to select one or more video data files from the video data files, and to display the extracted face images on the selection screen to lay out the face images in correspondence with the video data files; and a file processing module configured to execute a process for the one or more video data files selected on the selection screen.

The arrangement of an electronic apparatus according to an embodiment of the invention will be described first with reference to FIGS. 1 and 2. The electronic apparatus of this embodiment is implemented as, for example, a notebook type portable personal computer 10 serving as an information processing apparatus.

This personal computer 10 can record, play back, and edit video data (moving image data) such as broadcast program data and video data input from an external apparatus. That is, the personal computer 10 has a video processing function that allows the user to view and edit video data. This video processing function is implemented by, for example, a video processing application program installed in the personal computer 10. The video processing function also has a function of recording video data input from an external AV apparatus, and a function of playing back recorded video data and recorded broadcast program data.

Furthermore, the personal computer 10 has a face image list display function of displaying a list of face images of persons who appear in video data (moving image data) such as video data and broadcast program data stored in itself. This face image list display function is implemented as, for example, one function in the video processing function. The face image list display function is one of video indexing functions required to present, to the user, an overview of video data selected by the user as a navigation target. This face image list display function can present, to the user, persons who appear in video data as a navigation target. Furthermore, this face image list display function can also display thumbnail images generated based on representative images which represent video data.

The personal computer 10 can simultaneously present, to the user, face image lists associated with video data files using this face image list display function. By simultaneously displaying face image lists of video data files, the user can recognize the content of related video data files at once.

The face image list display function for video data files displays face images extracted from respective video data files by, for example, laying them out in order of frequency of appearance of the face images for respective video data files. The user can make operations such as selection and editing of a required video data file by selecting a video data file or face image upon observing the face image lists displayed for respective video data files.

FIG. 1 is a perspective view of a state in which a display unit of the computer 10 is opened. This computer 10 includes a computer main body 11 and display unit 12. In the display unit 12, a display device including a thin-film-transistor liquid crystal display (TFT-LCD) 17 is built.

The display unit 12 is attached to the computer main body 11 to be pivotal between an open position where the upper face of the computer main body 11 is exposed and a close position where the display unit 12 covers the upper face of the computer main body 11. The computer main body 11 has a low-profile, box-shaped housing, on the upper face of which a keyboard 13, a power button 14 used to turn on/off the power supply of the computer 10, an input operation panel 15, a touchpad 16, and speakers 18A and 18B are arranged.

The input operation panel 15 is an input apparatus used to input an event corresponding to a pressed button, and includes buttons used to launch functions. These buttons include operation buttons used to control a TV function (viewing and recording of broadcast program data/video data, and playback of recorded broadcast program data/video data). A remote controller unit interface module 20 for implementing communications with a remote controller unit used to remotely control the TV function of this computer 10 is provided to the front face of the computer main body 11. The remote controller unit interface module 20 includes an infrared ray signal receiving module and the like.

A TV broadcast antenna terminal 19 is provided to, e.g., the right side face of the computer main body 11. An external display connection terminal complying with, e.g., the High-Definition Multimedia Interface (HDMI) standard is arranged on, e.g., the back face of the computer main body 11. This external display connection terminal is used to output video data (moving image data) included in data such as broadcast program data to an external display.

The system arrangement of the computer 10 will be described below with reference to FIG. 2.

As shown in FIG. 2, the computer 10 includes a CPU 101, north bridge 102, main memory 103, south bridge 104, graphics processing unit (GPU) 105, video memory (VRAM) 105A, sound controller 106, BIOS-ROM 109, LAN controller 110, hard disk drive (HDD) 111, DVD drive 112, video processor 113, memory 113A, network controller 114 such as a wireless LAN controller, IEEE 1394 controller 115, embedded controller/keyboard controller IC (EC/KBC) 116, TV tuner 117, and EEPROM 118.

The CPU 101 is a processor which controls the operations of the computer 10, and executes an operating system (OS) 201 and various application programs such as a video processing application program 202, which are loaded from the hard disk drive (HDD) 111 onto the main memory 103. This video processing application program 202 is software for executing the video processing function. The video processing application program 202 executes a playback process that allows the user to view video data input from an external apparatus such as a camcorder 21 and broadcast program data received by the TV tuner 117, a recording process that records video data and broadcast program data in the HDD 111, an indexing process for the video data and broadcast program data recorded in the HDD 111, and the like. The CPU 101 also executes a basic input/output system (BIOS) stored in the BIOS-ROM 109. The BIOS is a program required for hardware control.

The north bridge 102 is a bridge device that connects between a local bus of the CPU 101 and the south bridge 104. The north bridge 102 includes a memory controller that executes access control of the main memory 103. Also, the north bridge 102 has a function of executing communications with the GPU 105 via a serial bus complying with the PCI EXPRESS specification.

The GPU 105 is a display controller which controls the LCD 17. A display signal generated by this GPU 105 is supplied to the LCD 17. The GPU 105 can output a digital video signal to an external display device 1 via an HDMI control circuit 3 and HDMI terminal 2.

The HDMI terminal 2 is the aforementioned external display connection terminal. The HDMI terminal 2 can output a digital audio signal and uncompressed digital video signal to the external display device 1 such as a television via a single cable. The HDMI control circuit 3 is an interface used to output a digital video signal to the external display device 1 called an HDMI monitor via the HDMI terminal 2.

The south bridge 104 controls respective devices on a Low Pin Count (LPC) bus and those on a Peripheral Component Interconnect (PCI) bus. The south bridge 104 includes an Integrated Drive Electronics (IDE) controller required to control the hard disk drive (HDD) 111 and DVD drive 112. Furthermore, the south bridge 104 also has a function of executing communications with the sound controller 106.

To the south bridge 104, the video processor 113 is connected via, e.g., a serial bus complying with the PCI EXPRESS specification.

The video processor 113 executes various processes associated with indexing of video data described above. The video processor 113 serves as an index processing module for executing a video indexing process. More specifically, in the video indexing process, the video processor 113 extracts face images of persons from moving image data included in video data, and outputs time stamp information indicating the timings of appearance of the extracted face images in the video data and the like. Face images are extracted by, for example, a face detection process for detecting a face region from each frame of moving image data included in video data, and a clipping process for clipping the detected face region from the frame. A face region can be detected by analyzing features of an image of each frame, and searching for a region having the feature similar to a face image feature sample prepared in advance. The face image feature sample is feature data calculated by statistically processing face image features of a large number of persons.

The memory 113A is used as a work memory of the video processor 113. In order to execute the indexing process for video data, a large calculation cost is required. In this embodiment, the video processor 113 as a dedicated processor different from the CPU 101 is used as a backend processor, and executes the indexing process. Hence, the indexing process can be executed without increasing the load on the CPU 101.

The sound controller 106 is a sound source device, which outputs audio data to be played back to the speakers 18A and 18B or the HDMI control circuit 3.

The network controller 114 is a wireless communication device which executes wireless communications complying with, e.g., the IEEE 802.11 specification.

The IEEE 1394 controller 115 executes communications with an external apparatus via a serial bus complying with the IEEE 1394 specification. To the IEEE 1394 controller 115, for example, the camcorder 21 is connected. The camcorder 21 stores a captured video in a storage module 21A as a video data file. The computer 10 can execute processes for the stored video data files by handling the storage module 21A as one of storage apparatuses of the computer 10 via the IEEE 1394 controller 115. Also, the computer 10 can similarly execute processes for the video data files by loading the video data files stored in the storage module 21A onto the main memory 103 or copying them to the HDD 111.

The embedded controller/keyboard controller IC (EC/KBC) 116 is a one-chip microcomputer, which integrates an embedded controller for power management, and a keyboard controller for controlling the keyboard (KB) 13 and touchpad 16. The embedded controller/keyboard controller IC (EC/KBC) 116 has a function of turning on/off the power supply of the computer 10 in response to a user's operation of the power button 14. Furthermore, the embedded controller/keyboard controller IC (EC/KBC) 116 has a function of executing communications with the remote controller unit interface 20.

The TV tuner 117 is a receiving apparatus which receives broadcast program data broadcast by a television (TV) broadcast signal, and is connected to the antenna terminal 19. This TV tuner 117 is implemented as a digital TV tuner which can receive digital broadcast program data such as terrestrial digital TV broadcast. The TV tuner 117 also has a function of capturing video data input from an external apparatus.

An indexing information display function executed by the video processing application program 202 will be described below with reference to FIG. 3.

The indexing process for video data is executed by the video processor 113 serving as the index processing module, as described above.

The video processor 113 executes the indexing process for, e.g., video data captured by the user using the camcorder 21 under the control of the video processing application program 202. Also, the video processor 113 can also execute the index processing for a video data file parallel to a process for copying that video data file stored in the storage module 21A of the camcorder 21 to the HDD 111.

In the video indexing process (to be also referred to as a face image indexing process hereinafter), the video processor 113 analyzes moving image data included in video data for respective frames. The video processor 113 extracts face images of persons from each of frames, and outputs time stamp information indicating the timing of appearance of each extracted face image. As the time stamp information corresponding to each face image, an elapsed time from the beginning of the video data until the face image appears, a frame number from the face image is extracted, and the like can be used.

Furthermore, the video processor 113 also outputs a size (resolution) of each extracted face image. Face detection result data (a face image, time stamp information TS, and a size) output from the video processor 113 is stored in a database 111C as face image indexing information. This database 111C is a storage area for storing indexing data, which is allocated in the HDD 111.

Furthermore, in the video indexing process, the video processor 113 executes a thumbnail image generation process parallel to the process for extracting face images. A thumbnail image is an image corresponding to, e.g., a frame of a predetermined number extracted from video data (a downscaled image). That is, the video processor 113 extracts, e.g., the frame of the predetermined number from the video data irrespective of whether or not that frame includes a face image, and outputs an image (thumbnail image) corresponding to the extracted frame and time stamp information TS indicating the timing of appearance of that thumbnail image. Thumbnail image generation result data (a thumbnail image and time stamp information TS) output from the video processor 113 is also stored in the database 111C as thumbnail indexing information. Thumbnail images may be generated from images (downscaled images) corresponding to frames extracted from video data for every predetermined number of frames.

Furthermore, in the video indexing process, the video processor 113 also executes a face image classification process for classifying extracted face images to person-dependent face image groups. Face images which belong to a certain face image group, i.e., those corresponding to an identical person are associated with an identifier (ID) used to identify that face image group, i.e., that person.

As shown in FIG. 3, the video processing application program 202 includes a face image list display processing module 301 required to execute a face image list display function. This face image list display processing module 301 is implemented as, for example, an indexing viewer program, and displays an indexing view screen for presenting overviews of video data using indexing information (e.g., face indexing information and thumbnail indexing information) of respective video data files stored in the database 111C.

More specifically, the face image list display processing module 301 reads items of face image indexing information (face images, corresponding items of time stamp information TS, and sizes) of respective video data files from the database 111C, and displays lists of face images of persons who appear in the respective video data files on a two-dimensional display area (to be referred to as a face thumbnail area hereinafter) on the indexing view screen. In this case, the face image list display processing module 301 selects face images with, e.g., higher frequencies of appearance of those extracted for respective video data files. The face image list display processing module 301 lays out and displays the given numbers of selected face images for respective video data files. In this case, the face image list display processing module 301 lays out the predetermined number of face images selected from a certain video data file, e.g., in order of frequency of appearance of these face images (in order of detected duration of face images), and displays them for each of video data files.

The face image list display processing module 301 uses the indexing view screen as a selection screen. When the user selects a face image from those displayed on this selection screen, and the selection screen displays other face images assigned the same identifier as that assigned to the selected face image, the face image list display processing module 301 can also display the face images assigned the same identifier to be distinguished from remaining face images.

The face image list display processing module 301 reads items of thumbnail indexing information (representative images, time stamp information TS, and sizes) of respective video data files from the database 111C, and displays representative images corresponding to video data files on the selection screen (indexing view screen) using these items of thumbnail indexing information.

With this face image list display function, persons who appear in video data files can be presented to the user in an easily understood manner. A practical configuration example of the face thumbnail area will be described later with reference to FIG. 6 and subsequent drawings.

FIG. 4 shows the relationship between some face image groups obtained by classifying face images by the face image classification process and IDs (face IDs).

The video processor 113 executes the face image classification process for classifying face images corresponding to an identical person to an identical category based on the correlation of feature data between face images extracted from moving image data of certain video data. In the face image classification process, face images having similar features are classified into an identical category (identical face image group). As shown in FIG. 4, an identical ID (face ID) is assigned to face images corresponding to an identical person. In FIG. 4, category 1 indicates a set of face images of certain person A, category 2 indicates a set of face images of certain person B, and category 3 indicates a set of face images of certain person C. An ID (face ID=A) used to identify person A is associated with the face images which belong to category 1. An ID (face ID=B) used to identify person B is associated with the face images which belong to category 2. An ID (face ID=C) used to identify person C is associated with the face images which belong to category 3.

Figure 5:
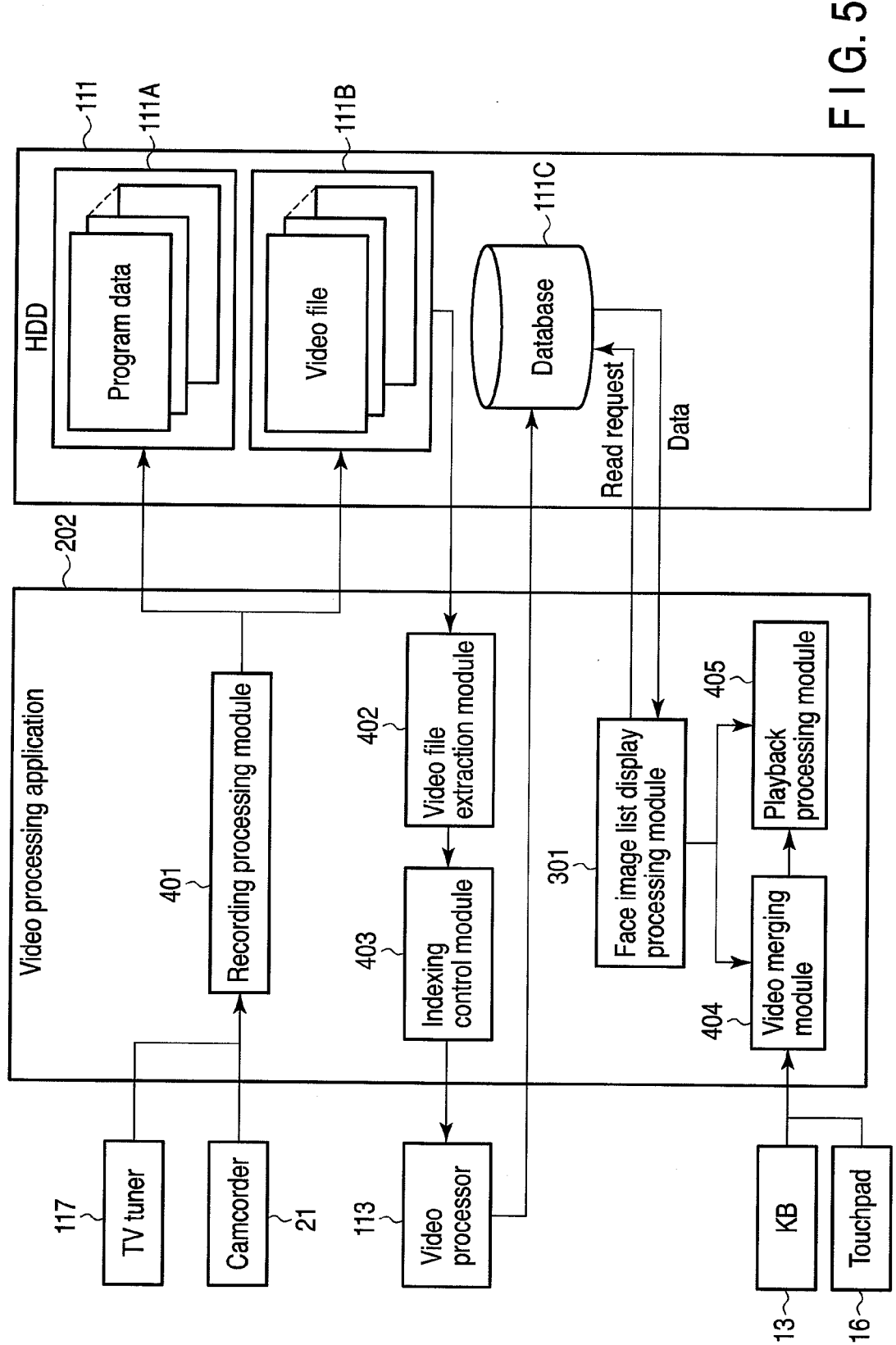
FIG. 5 is an exemplary block diagram showing the functional arrangement of programs used in the electronic apparatus according to the embodiment.

The functional arrangement of the video processing application program 202 will be described below with reference to FIG. 5.

The video processing application program 202 includes a recording processing module 401, video file extraction module 402, indexing control module 403, video merging module 404, and playback processing module 405 in addition to the aforementioned face image list display processing module 301.

The recording processing module 401 executes a recording process for recording broadcast program data received by the TV tuner 117 or video data files input from the camcorder 21 in the HDD 111. Video data input to the recording processing module 401 are stored in the HDD 111 as program data 111A or video data files 111B. The recording processing module 401 also executes a scheduled video recording process for receiving broadcast program data designated by recording schedule information (a channel number, and date and time), which is set in advance by the user, using the TV tuner 117, and recording that broadcast program data in the HDD 111.

The video file extraction module 402 extracts video data that meet a predetermined condition from the program data 111A and video data files 111B stored in the HDD 111. For example, the video file extraction module 402 extracts video data files captured by the camcorder 21 within a predetermined period from the video data files 111B stored in the HDD 111. More specifically, the video file extraction module 402 extracts video data files captured (recorded) in a single day or those which have recording time intervals of several tens of minutes or less. Also, video data files stored under a directory designated by the user may be simply used as those to be processed.

In an image capturing operation by the camcorder 21, every time the user pauses or stops the image capturing operation, a video data file is created. For this reason, when the user makes the image capturing operation while pausing or stopping it, for example, video data files corresponding to a plurality of scenes may often be created. Each video data file is stored in the storage module 21A in the camcorder 21 together with information indicating an image capturing time (recording time). Therefore, video data files having relevance are often stored in the storage module 21A. The video file extraction module 402 extracts video data files having recording times within a given period of those stored in the storage module 21A or those stored in a storage medium such as the video data files 111B stored in the HDD 111. As a result, video data files having relevance can be automatically selected as those which are to undergo the indexing process.

The indexing control module 403 controls the video processor (index processing module) 113 to execute the aforementioned indexing process for the video data files extracted by the video file extraction module 402. More specifically, the indexing control module 403 executes image extraction for extracting face images including face images of persons in videos obtained by playing back the extracted video data files, classifying face images across the video data files, and assigning an identical identifier to face images classified as an identical person. Also, the indexing control module 403 extracts at least one video frame as a representative image that represents a video data file for each of video data files. The index processing result for the video data files is stored as indexing information in the database 111C of the HDD 111.

The video merging module 404 executes a process for one or more video data files selected by, e.g., a user's operation in order of recording time. For example, the video merging module 404 executes a process for creating one video data by merging video data stored in the HDD 111. When a face image is selected from the face images displayed on the indexing view screen as the selection screen, the video merging module 404 obtains the identifier assigned to the selected face image, and processes a video data file from which the selected face image is extracted and video data files from which other face images assigned the same identifier as the obtained identifier in order of recording time of these video data files. More specifically, when the user inputs a merge request event while video data files or face images are selected on the indexing view screen, for example, the video merging module 404 merges the selected video data files and video data files to which the selected face image belongs in chronological order. As a result, one video data obtained by merging video data of some video data files in order of recording time is generated as a file.

For example, in a process for merging video data file A captured at a certain time (T1) and video data file B captured at a time (T2) later than the time (T1), video data (moving image data) of video data file B is merged after that of video data file A, thus creating one video data. The created video data is stored in the HDD 111 as a video data file. Note that the video merging module 404 can execute not only the process for physically merging video data files, but also a process for creating one video data by logically merging video data files. For example, upon logically merging video data files A and B above, the video merging module 404 generates a playlist for sequentially playing back these video data files A and B in order of video data file A and video data file B.

The playback processing module 405 executes a process for playing back video data stored in the HDD 111. Also, when the user inputs a playback request event while one face image in a face image list of certain video data is selected, the playback processing module 405 can start playback of the video data from a timing corresponding to a position in the video data where the selected face image appears.

The user can determine a position where playback of video data is to start while observing the face image list. Therefore, the user can view only one or more scenes where a person of user's interest appears by selecting an arbitrary face image in the face image list.

Note that user's operations such as selection of a video data file and face image, and inputs of a merge request event and playback request event are made using, for example, the keyboard 13, touchpad 16, and a remote controller unit.

The indexing process need not always be executed by the video processor 113. For example, the video processing application program 202 may have a function of executing the indexing process. In this case, the CPU 101 executes the indexing process under the control of the video processing application program 202.

A detailed configuration of the indexing view screen will be described below with reference to FIG. 6.

FIG. 6 shows an example of the indexing view screen displayed on the LCD 17 by the face image list display processing module 301. This indexing view screen is created using indexing information obtained by executing the indexing process of video data files (for example, those which are captured and recorded using the camcorder 21). This indexing view screen is a selection screen that allows the user to select one or more video data files from a list of video data files. The face image list display processing module 301 lays out and displays face images extracted from video data files for respective video data files. The face image list display processing module 301 displays each of face images on the selection screen, and when one or more face images are selected from the face images, the face image list display processing module 301 selects one or more video data files from which the selected face images are extracted as video data files to be processed.

This indexing view screen displays a video file indexing view area that displays indexing information for each video data file. This video file indexing view area includes check boxes used to select respective video data files, a representative thumbnail area used to display downscaled images of representative video frames that represent respective data files, the aforementioned face thumbnail area used to display lists of face images for respective video data file, and indications that indicate image capturing dates and times and image capturing durations of respective video data files. The user can select one or more video data files from a list of video data files using the indexing view screen. This selection can use the aforementioned check boxes, thumbnail images, and the like.

When the video file extraction module 402 extracts four video data files as related video data files, the video file indexing view area includes four indexing view areas 50, 60, 70, and 80 respectively corresponding to the four extracted video data files. For example, the indexing view area 50 includes a check box 51, representative thumbnail area 52, and face thumbnail areas 53A to 53D. The indexing view areas 60, 70, and 80 have the same configuration. That is, one indexing view area is associated with one video data file, and displays indexing information of that video data file.

Representative thumbnail areas 52, 62, 72, and 82 display representative thumbnail images as images (downscaled images) of representative frames of the video data files extracted from the database 111C by the face image list display processing module 301. The representative frame is, for example, a video frame of a predetermined number in a video sequence of each video data file.

Face thumbnail areas 53, 63, 73, and 83 display face images of persons who appear in video data files extracted from the database 111C by the face image list display processing module 301. The face image list display processing module 301 extracts face images of respective persons who appear in respective video files from the database 111C. The extracted face images are laid out in order of frequency of appearance of the face images, and are displayed on the face thumbnail areas.

For example, for a certain video data file, face images are laid out and displayed, so as to display a face image of a person with the first highest frequency of appearance on face thumbnail area 53A, that of a person with the second highest frequency of appearance on face thumbnail area 53B, that of a person with the third highest frequency of appearance on face thumbnail area 53C, . . . . In this case, the face thumbnail areas of the indexing view area that displays indexing information of one video data file never display multiple face images of an identical person. That is, face thumbnail areas 53A, 53B, 53C, and 53D respectively display face images classified as different persons. On the other hand, the face thumbnail areas of different indexing view areas (video data files) often display face images of an identical person. FIG. 6 exemplifies a case in which face thumbnail areas 63A, 73A, and 83A display face images of an identical person.

Since such indexing view screen is displayed, the user can recognize persons who appear in each video data file, and also persons who appear across video data files. That is, relevance between video data files based on persons can be presented to the user, to assist user's operations such as playback and editing of video data files. For example, when the user wants to browse or edit video data files to focus attention on a certain person, he or she can easily select required video data files from these video data files based on the presented indexing information such as the face image lists. In order to recognize a person who appears across video data files, when the user selects a face image, face images of the same person as that of the selected face image may be displayed distinctly from those of other persons on the face image lists.

Such user's operation assistance is effective to edit video data files created every time the user pauses or stops a camera when he or she makes an image capturing operation using a camcorder that uses a disk medium in, e.g., an AVCHD format. As described above, in a camcorder of the AVCHD format, since a video data file is created every pause operation or the like, when the user intermittently performs image capturing operations while making a pause operation and the like, a plurality of video data files with image capturing durations as short as several minutes are created within a short period of time. In such case, it is very troublesome for the user to recognize the content of respective video data files by executing playback and presentation of indexing information for each video data file. For this reason, by presenting items of indexing information of video data files at the same time, the user can recognize the content and relevance of respective video data files, and can select required video data files from those video data files.

The procedures of the display process of indexing information of video data files and the merging process of video data files by a user's operation will be described below with reference to the flowchart of FIG. 7. Note that the following description will be given for only the video data files 111B, as video data to be processed, of the program data 111A and video data files 111B as video data stored in the HDD 111.

The video file extraction module 402 extracts video data files which have recording times within a designated period from the video data files 111B stored in the HDD 111 (block S101). Note that video data files are extracted based on the recording times. However, conditions for extracting video data files such as those stored under a designated directory and the like can be set as needed.

The video processor 113 controlled by the indexing control module 403 extracts face images and representative images from the extracted video data files (block S102). The video processor 113 stores the face images and a representative thumbnail image created based on at least one representative image in the database 111C of the HDD 111. The video processor 113 also stores items of time stamp information (TS) of frames from which the representative images and face images are extracted, and items of image size information of the face images in the database 111C.

Furthermore, the video processor 113 classifies the extracted face images and assigns an ID (face ID) to face images which belong to each of groups each including face images classified as an identical person (block S103). The video processor 113 stores the items of ID information of respective face images in the database 111C.

The face image list display processing module 301 displays the indexing view screen of face images stored in the database 111C in correspondence with the extracted video data files based on the detected durations or detected frequencies of face images for respective persons (for respective face IDs) (block S104). The face image list display processing module 301 displays a check box, representative thumbnail image, a predetermined number of face thumbnail images, and the recording date and time and recording duration of a video data file for each of the extracted video data file. As the representative thumbnail image, an image stored in the database 111C for each video data file is used. As the face thumbnail images, a predetermined number of corresponding face images to be used are extracted from the database 111C in descending order of detected frequency of persons (face IDs). Note that the representative thumbnail image and predetermined number of face thumbnail images for each of the extracted video data files are laid out and displayed in order of, e.g., recording time of the respective video files.

The video merging module 404 determines if the user inputs an edit instruction using the keyboard 13, touchpad 16, or the like (block S105). If an edit instruction is input (YES in block S105), the video merging module 404 determines if at least one of the check boxes and face thumbnail images displayed on the indexing view screen is selected (block S106).

If no edit instruction is input (NO in block S105), or if neither the check boxes nor face thumbnail images on the indexing view screen are selected (NO in block S106), the video merging module 404 executes the process from block S105 again.

If at least one of the check boxes and face thumbnail images displayed on the indexing view screen is selected (YES in block S106), the video merging module 404 determines if the check box is selected (block S107). If the check box is selected (YES in block S107), the video merging module 404 extracts a video data file corresponding to the selected check box. If the check box is not selected (NO in block S107), i.e., if a face thumbnail image is selected, the video merging module 404 obtains an ID assigned to the selected face thumbnail image (block S109). The video merging module 404 then extracts video data files including those to which face thumbnail images assigned the obtained ID respectively belong (block S110). That is, the video merging module 404 extracts video data files to which other face thumbnail images assigned the same ID as that assigned to the selected face thumbnail image respectively belong in addition to the video data file to which the selected face thumbnail image belongs. In this case, face thumbnail images assigned the same ID as that of the selected face thumbnail image may be highlighted and displayed distinctly from remaining face thumbnail images. For example, when the user selects a face thumbnail image 63A on the indexing view screen shown in FIG. 6, face thumbnail image 63A and face thumbnail images 73A and 83A indicating the same person as face thumbnail image 63A are displayed with emphasis.

The video merging module 404 determines if video data files corresponding to all the selected check boxes or face thumbnail images are extracted (block S111). If video data files corresponding to all the selected check boxes or face thumbnail images are not extracted yet (NO in block S111), the video merging module 404 repeats the processes from block S107 to block S111 while updating the selected check box or face thumbnail image of interest. If video data files corresponding to all the selected check boxes or face thumbnail images are extracted (YES in block S111), the video merging module 404 merges the extracted video data files in order of recording time of the video data files (block S112).

With the above processes, the indexing process is executed for video data files, and items of indexing information based on the indexing process result are presented to the user as the indexing view screen simultaneously for the video data files. The user can recognize overviews of respective video data files and relevance among video data files by the presented indexing view screen. Also, by selecting video data files or face images, required video data files can be designated and merged.

Figure 8:
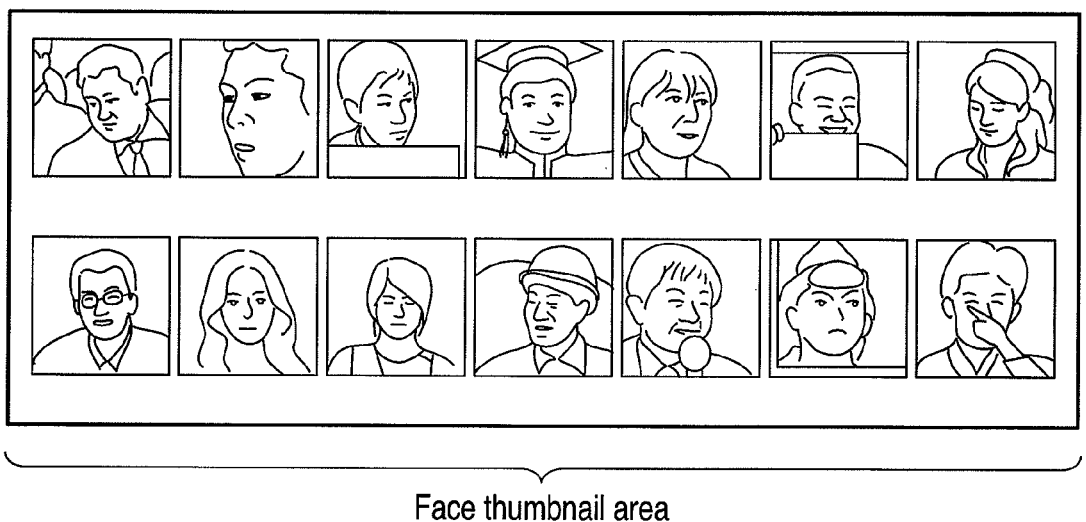
FIG. 8 is an exemplary view showing another example of the indexing view screen displayed on the display device by the electronic apparatus according to the embodiment.

FIG. 8 shows another example of the indexing view screen displayed on the LCD 17 by the face image list display processing module 301. As in the indexing view screen shown in FIG. 6, this indexing view screen is created using indexing information obtained by executing the indexing process of video data files (e.g., video data captured using the camcorder 21). On this indexing view screen, only a face thumbnail area is set.

This face thumbnail area displays face images of persons who appear in video data files to be processed by the face image list display processing module 301. One face image per person is displayed on the face thumbnail area. That is, the video data files to be processed are handled as one video data file as if they were merged, and one face image is displayed on the face thumbnail area in correspondence with each of persons who appear in video data of that one video data file.

For example, the face image list display processing module 301 classifies face images extracted from all video frames which form video data files to be processed for respective persons, and displays face images on the face thumbnail area in descending order of frequency of appearance of persons. In this case, the indexing control module 403 (video processor 113) may simultaneously execute the indexing process across video data files in place of that for each video data file. That is, the indexing control module 403 (video processor 113) applies classification based on persons using a clustering process or the like to all face images extracted from video data files and assigns face IDs in place of extracting face images from each video data file, and classifying these face images to assign face IDs to them. On the face thumbnail area, one face thumbnail image is displayed per face images classified as an identical person.

That is, this indexing view screen can display an integrated face image list of persons who appear in video data files to be processed. The user can make an edit operation or the like regardless of units as files by observing the integrated face image list of persons who appear in the video data files to be processed. For example, when the user selects one face thumbnail image from the face thumbnail area, he or she can execute a process for physically or logically merging all video data files to which face images assigned the same ID as that assigned to the selected face thumbnail image belong, based on that ID regardless of units as files.

Figure 9:
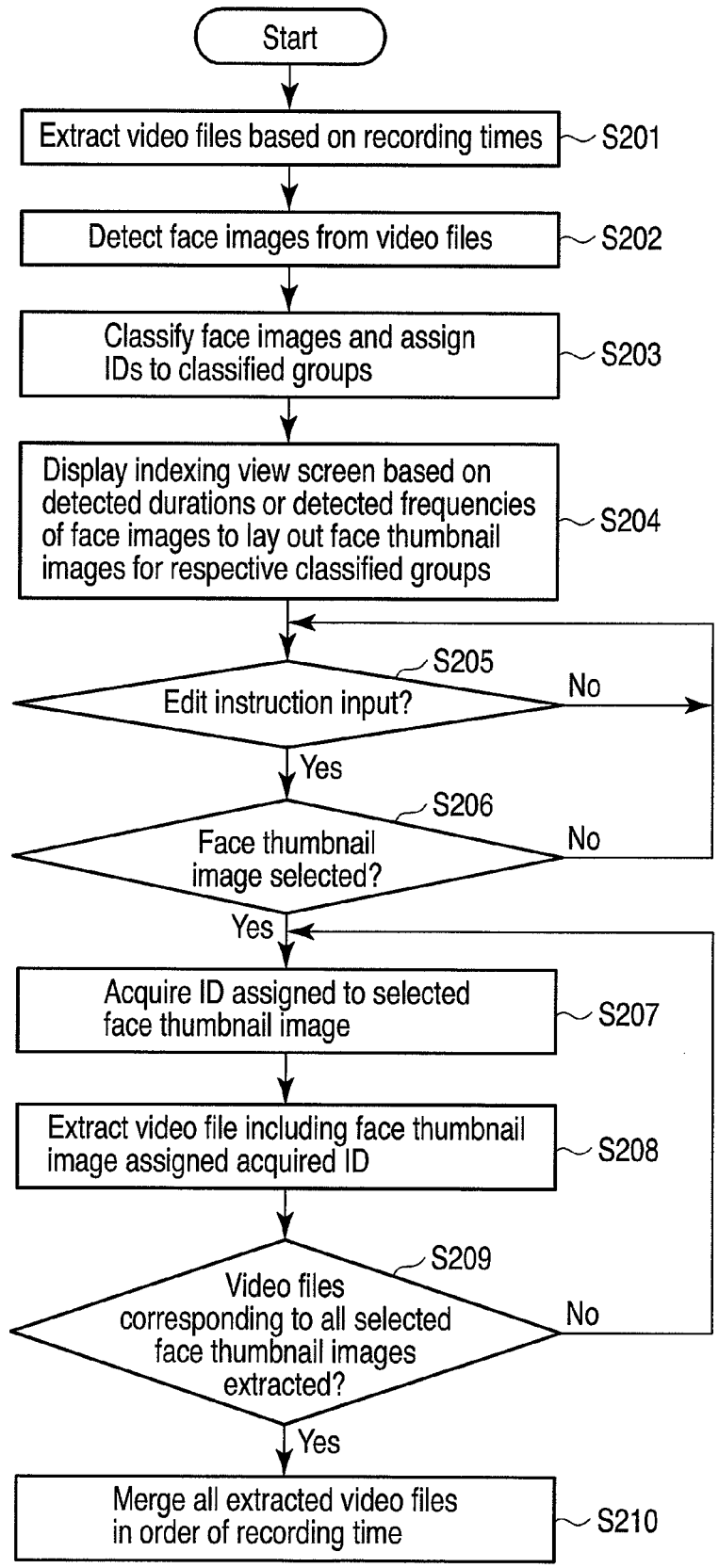
FIG. 9 is an exemplary flowchart showing another example of the procedure of an indexing information display process and video data file merging process executed by the electronic apparatus according to the embodiment.

The flowchart shown in FIG. 9 will explain the procedures of the display process of indexing information of video data files using the indexing view screen shown in FIG. 8 and the merging process of video data files in response to a user's operation. Note that the following description will be given for only the video data files 111B, as video data to be processed, of the program data 111A and video data files 111B as video data stored in the HDD 111.

The video file extraction module 402 extracts video data files which have the recording times of video data within a designated period from the video data files 111B stored in the HDD 111 (block S201). Note that video data files are extracted based on the recording times. However, conditions for extracting video data files such as those stored under a designated directory and the like can be set as needed.

The video processor 113 controlled by the indexing control module 403 extracts face images from the extracted video data files (block S202). The video processor 113 stores the extracted face images in the database 111C of the HDD 111. The video processor 113 also stores items of time stamp information (TS) of frames from which the face images are extracted, and items of image size information of the face images in the database 111C.

Furthermore, the video processor 113 classifies all the extracted face images and assigns an ID (face ID) to face images which belong to each of groups each including face images classified as an identical person (block S203). The video processor 113 stores the items of ID information of respective face images in the database 111C.

The face image list display processing module 301 displays the indexing view screen of face images stored in the database 111C based on the detected durations or detected frequencies of face images for respective persons (for respective face IDs) (block S204). The face image list display processing module 301 displays a predetermined number of face thumbnail images. As the face thumbnail images, a predetermined number of corresponding face images to be displayed are extracted from the database 111C in descending order of detected frequency of persons (face IDs).

The video merging module 404 determines if the user inputs an edit instruction using the keyboard 13, touchpad 16, or the like (block S205). If an edit instruction is input (YES in block S205), the video merging module 404 determines if at least one face thumbnail image is selected on the indexing view screen (block S206).

If no edit instruction is input (NO in block S205), or if no face thumbnail image is selected on the indexing view screen (NO in block S206), the video merging module 404 executes the process from block S205 again.

If at least one face thumbnail image is selected on the indexing view screen (YES in block S206), the video merging module 404 obtains an ID assigned to the selected face thumbnail image (block S207). The video merging module 404 then extracts video data files including those to which face thumbnail images assigned the obtained ID respectively belong (block S208). That is, the video merging module 404 extracts video data files to which other face thumbnail images assigned the same ID as that assigned to the selected face thumbnail image respectively belong in addition to the video data file to which the selected face thumbnail image belongs.

The video merging module 404 determines if video data files corresponding to all the selected face thumbnail images are extracted (block S209). If video data files corresponding to all the selected face thumbnail images are not extracted yet (NO in block S209), the video merging module 404 repeats the processes from block S207 to block S209 while updating the selected face thumbnail image of interest. If video data files corresponding to all the selected face thumbnail images are extracted (YES in block S209), the video merging module 404 merges the extracted video data files in order of recording time of the video data files (block S210).

With the above processes, the indexing process is executed for video data files, and items of indexing information based on the indexing process result are integrated and presented to the user as the indexing view screen in association with the video data files. The user can recognize overviews of respective video data files using the presented indexing view screen regardless of units as files. Also, by selecting a face image, video data files can be automatically merged without individually designating these video data files.

Figure 7:
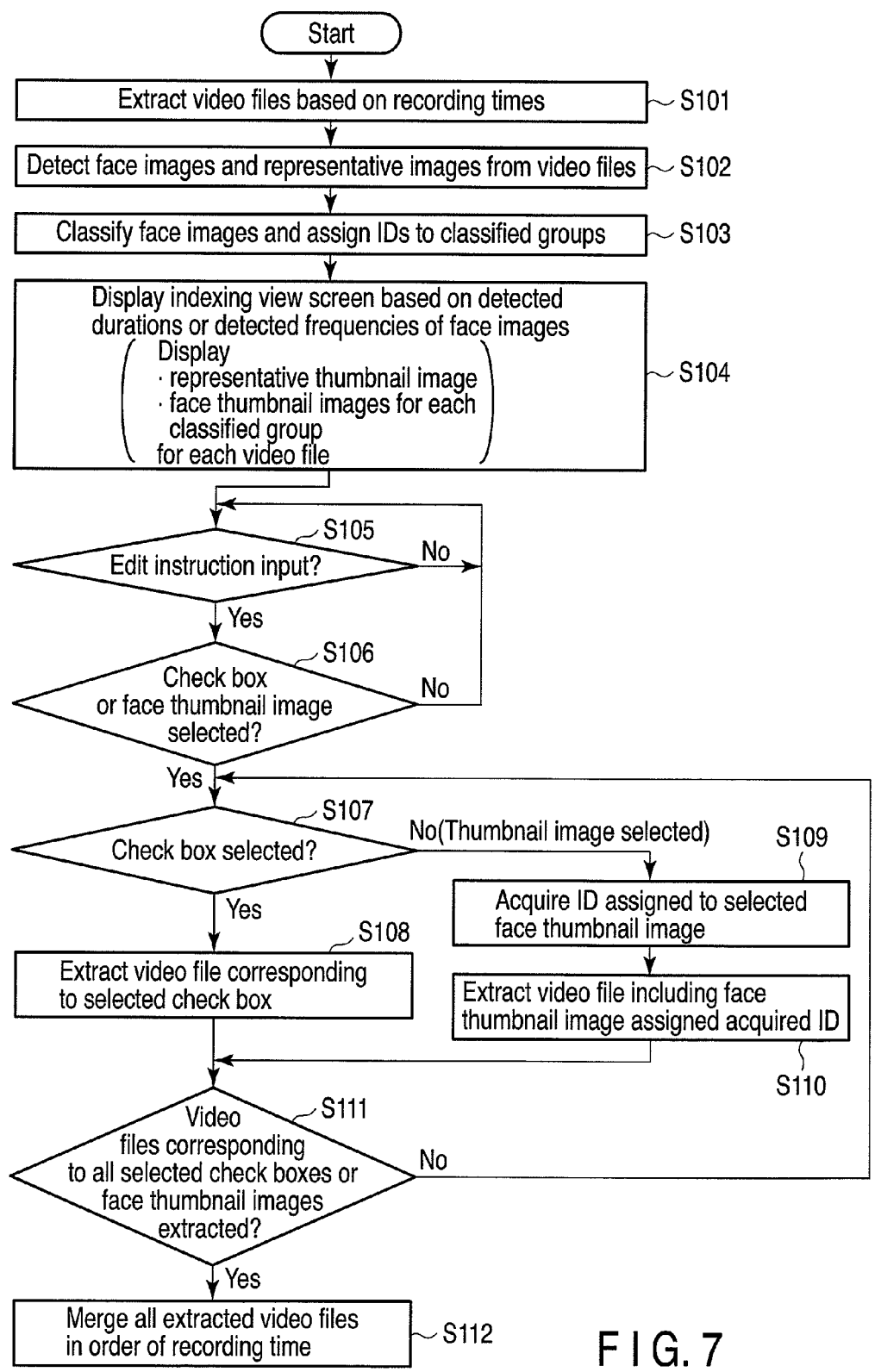
FIG. 7 is an exemplary flowchart showing an example of the procedure of an indexing information display process and video data file merging process executed by the electronic apparatus according to the embodiment.

In the flowcharts shown in FIGS. 7 and 9, the processes for merging video data files selected based on the user's input using the indexing view screen (selection screen) have been explained. However, these processes may be those for applying an arbitrary edit operation or the like to these selected video data files, and are not limited to those for merging video data files.

As described above, according to this embodiment, items of indexing information associated with video data files are presented to the user parallelly or after they are integrated. Hence, since not only the overviews of video data files but also helpful information required to recognize the relevance between video data files can be presented to the user, user's operations associated with playback and editing of video data files can be assisted.

In the description of this embodiment, the computer 10 executes all of the indexing process, face image list display process, and video merging process. Alternatively, the camcorder 21 may execute the face image list display process and video merging process, and the computer 10 may execute only the indexing process. In this case, the video processing application program 202 extracts video data files to be processed from those stored in the storage module 21A of the camcorder 21, and executes the indexing process for each of these video data files to be processed. The video processing application program 202 transmits information indicating the indexing process result to the camcorder 21. More specifically, the video processing application program 202 transmits, to the camcorder 21, information including face images extracted from the video data files to be processed, IDs assigned to the face images, and the frequencies of appearance as information indicating the indexing process result. The camcorder 21 displays the indexing view screen shown in FIG. 6 or 8 on its display device based on the information indicating the indexing process result. Then, the camcorder 21 executes the process for physically or logically merging video data files in accordance with a user's operation made while observing the indexing view screen.

Since the procedures of all the indexing information display process, playback process, and merging process of this embodiment can be implemented by software, the same effects as in this embodiment can be easily implemented by introducing this software to a normal computer via a computer-readable storage medium.

The electronic apparatus of this embodiment can be implemented not only by the computer 10 but also by, for example, various consumer electronic apparatuses such as an HDD recorder, DVD recorder, and television apparatus. Also, the electronic apparatus of this embodiment can also be implemented by the camcorder 21 alone. In this case, the functions of the video processing application program 202 can be implemented by hardware such as a DSP or microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   an image extraction module configured to extract video data files having recording times within a predetermined period from stored video data files in a storage medium and to extract face images from each of the extracted video data files, the extracted face images comprising face images of persons in video obtained by playing back the extracted video data files;
   a display control module configured to display a selection screen configured to enable a user to select amongst the extracted video data files, to display the extracted face images on the selection screen to be selectable by laying out the extracted face images for each of the extracted video data files, and, when the face images are selected, to select video data files comprising the selected face images; and
   a file processing module configured to perform a process of merging the video data files selected on the selection screen in accordance with an order of recording times.

2. The electronic apparatus of claim 1, wherein
   the image extraction module is configured to classify the face images across the extracted video data files, and to assign an identifier to face images classified as an identical person, and
   the file processing module is configured to detect an identifier assigned to a face image when the face image is selected, and to process a video data file comprising the selected face image and video data files comprising other face images assigned the detected identifier in accordance with an order of recording times of the video data files.

3. The electronic apparatus of claim 2, wherein the display control module is configured to display the face images assigned an identifier of the selected face image distinctly from face images not assigned the identifier.

4. The electronic apparatus of claim 1, wherein the image extraction module is configured to extract at least one video frame as a representative image for each of the extracted video data files from which face images are extracted, and
   the display control module is configured to display the representative image corresponding to each of the extracted video data files on the selection screen.

5. A video processing method comprising:
   extracting video data files having recording times within a predetermined period from stored video data files in a storage medium, and extracting face images from each of the extracted video data files, the face images comprising face images of persons in video obtained by playing back the extracted video data files;
   displaying a selection screen configured to enable a user to select amongst the extracted video data files, displaying the extracted face images on the selection screen to be selectable by laying out the extracted face images for each of the extracted video data files, and, when face images are selected, selecting video data files comprising the selected face images; and
   performing a process of merging the video data files selected on the selection screen in accordance with an order of recording times.

* * * * *